(12) United States Patent
Zhu et al.

(10) Patent No.: US 10,608,530 B1
(45) Date of Patent: Mar. 31, 2020

(54) RESONANCE SWITCHED TANK CONVERTER WITH MULTIPLE CONVERSION UNITS

(71) Applicant: Delta Electronics (Shanghai) Co., Ltd., Shanghai (CN)

(72) Inventors: Tiansheng Zhu, Shanghai (CN); Yiqing Ye, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/529,038

(22) Filed: Aug. 1, 2019

(30) Foreign Application Priority Data

Nov. 12, 2018 (CN) .......................... 2018 1 1338613

(51) Int. Cl.
*H02M 3/07* (2006.01)

(52) U.S. Cl.
CPC ...... *H02M 3/073* (2013.01); *H02M 2003/075* (2013.01)

(58) Field of Classification Search
CPC .......... H02M 3/07; H02M 3/073; H02M 1/083
See application file for complete search history.

(56) References Cited

U.S. PATENT DOCUMENTS

| | | | | |
|---|---|---|---|---|
| 8,737,093 B1* | 5/2014 | Baker | ...................... | H02M 3/07 307/82 |
| 8,817,501 B1* | 8/2014 | Low | ...................... | H02M 3/073 363/60 |
| 9,024,478 B2* | 5/2015 | Cooley | ................... | H02J 3/385 307/82 |
| 9,917,517 B1* | 3/2018 | Jiang | ........................ | H02M 1/34 |
| 10,439,493 B1* | 10/2019 | Zafarana | ............... | H02M 1/088 |
| 2008/0013349 A1* | 1/2008 | Yanagida | .............. | H02M 3/073 363/60 |
| 2019/0334434 A1* | 10/2019 | Jong | ..................... | H02M 3/073 |

FOREIGN PATENT DOCUMENTS

CN 107834844 A 3/2018

OTHER PUBLICATIONS

Shuai Jiang et al., Switched Tank Converters, IEEE, Applied Power Electronics Conference and Exposition (APEC), pp. 81-90, Mar. 2018.

* cited by examiner

*Primary Examiner* — Yusef A Ahmed
*Assistant Examiner* — Shahzeb K Ahmad
(74) *Attorney, Agent, or Firm* — Kirton McConkie; Evan R. Witt

(57) ABSTRACT

A switched tank converter includes at least three conversion units. Each conversion unit is a first-type conversion unit or a second-type conversion unit. An end of the support capacitor of each first-type conversion unit is electrically connected with a ground end. An end of a half-bridge clamping circuit of the second-type conversion unit is electrically connected with the ground end. A middle point of the half-bridge clamping circuit is electrically connected with an end of the support capacitor of the second-type conversion unit. The first-stage conversion unit is the first-type conversion unit. At least one conversion unit of the third-stage conversion unit to the Nth-stage conversion unit is the second-type conversion unit. Another end of the half-bridge clamping circuit of at least one second-type conversion unit is electrically connected with another end of the support capacitor of the lower-stage conversion unit excluding the first-stage conversion unit.

10 Claims, 14 Drawing Sheets

RESONANCE SWITCHED TANK CONVERTER WITH MULTIPLE CONVERSION UNITS

CROSS REFERENCE

This application is based upon and claims priority to Chinese Patent Application No. 201811338613.0, filed on Nov. 12, 2018, the entire contents thereof are incorporated herein by reference.

TECHNICAL FIELD

The present disclosure relates to a converter, and more particularly to a switched tank converter.

BACKGROUND

With the continuous expansion of the data center market of the global Internet, the amount of the electric power supplied to the data center is gradually increased, and the power supply demands on the processor of the data center are gradually increased. Therefore, a converter system with a two-stage configuration is usually required to power the processor of the data center. The two-stage converter system includes a front-stage converter and a rear-stage converter. The front-stage converter needs higher efficiency. For example, the front-stage converter is a LLC converter, a phase-shifted full-bridge converter or a switched tank converter. In addition, the rear-stage converter is usually a buck converter. Since the two-stage converter system has high frequency, small volume, high dynamic response and associated benefits, the two-stage converter system is widely applied to the data center.

In comparison with the LLC converter and the phase-shifted full-bridge converter, the switched tank converter is not equipped with a transformer. Consequently, the volume of the switched tank converter is smaller than the volume of the LLC converter and the volume of the phase-shifted full-bridge converter. Moreover, at the low transformer ratio, the operating efficiency of the switched tank converter is higher than the operating efficiency of the LLC converter and the operating efficiency of the phase-shifted full-bridge converter. Recently, the switched tank converter is widely used as the front-stage converter of the two-stage converter system.

The conventional switched tank converter includes a plurality of conversion units. In other words, the switched tank converter has a multi-stage conversion structure. According to the transformer ratio, the conventional switched tank converters are divided into two types, i.e., a first-type switched tank converter and a second-type switched tank converter. As the stage number (or the conversion unit number) of the first-type switched tank converter is increased by one, the transformer ratio is added by 1. That is, if the first-type switched tank converter has an N-stage conversion structure, the highest transformer ratio is (N+1). As the stage number (or the conversion unit number) of the second-type switched tank converter is increased by one, the transformer ratio is added by 2. That is, if the second-type switched tank converter has an N-stage conversion structure, the highest transformer ratio is 2N.

However, in case that the high transformer ratio is required, the applications of the first-type switched tank converter and the second-type switched tank converter are limited. For example, the first-type switched tank converter needs a 15-stage conversion structure to achieve the transformer ratio of 16:1, and the second-type switched tank converter needs an 8-stage conversion structure to achieve the transformer ratio of 16:1. That is, the circuitry of the first-type switched tank converter or the second-type switched tank converter is complicated and not cost-effective.

Therefore, there is a need of providing an improved switched tank converter.

SUMMARY

In accordance with an aspect of the present disclosure, a switched tank converter is provided. The switched tank converter includes N conversion units, which are arranged in N stages, wherein N is larger than or equal to 3. Each conversion unit is selected from one of a first-type conversion unit and a second-type conversion unit. Each conversion unit includes an input end, an output end, a support capacitor, a half-bridge inverter circuit, a half-bridge rectifier circuit and a resonant circuit. A first end of the support capacitor is electrically connected with the output end. A first end of the half-bridge inverter circuit is electrically connected with the input end. A second end of the half-bridge inverter circuit is electrically connected with the output end. A first end of the half-bridge rectifier circuit is electrically connected with a ground end. A second end of the half-bridge rectifier circuit is electrically connected with the first end of the support capacitor of the first-stage conversion unit. A first end of the resonant circuit is electrically connected with a middle point of the half-bridge inverter circuit. A second end of the resonant circuit is electrically connected with a middle point of the half-bridge rectifier circuit. A second end of the support capacitor of each first-type conversion unit is electrically connected with the ground end. Each second-type conversion unit includes a half-bridge clamping circuit. A first end of the half-bridge clamping circuit is electrically connected with the ground end. A middle point of the half-bridge clamping circuit is electrically connected with the second end of the support capacitor of the second-type conversion unit. The output end of each conversion unit is electrically connected with the input end of a next-stage conversion unit. The output end of the first-stage conversion unit is electrically connected with a load end. The first-stage conversion unit is the first-type conversion unit. The input end of the Nth-stage conversion unit is electrically connected with a power end. Moreover, at least one conversion unit of the third-stage conversion unit to the Nth-stage conversion unit is the second-type conversion unit. The second end of the half-bridge clamping circuit of each second-type conversion unit of the second-stage conversion unit to the Nth-stage conversion unit is electrically connected with the first end of the support capacitor of the lower-stage conversion unit. The second end of the half-bridge clamping circuit of at least one second-type conversion unit of the third-stage conversion unit to the Nth-stage conversion unit is not electrically connected with the first end of the support capacitor of the first-stage conversion unit.

The above contents of the present disclosure will become more readily apparent to those ordinarily skilled in the art after reviewing the following detailed description and accompanying drawings, in which:

BRIEF DESCRIPTION OF THE DRAWINGS

FIG. 1C is a schematic circuit diagram illustrating the switched tank converter of FIG. 1A, in which all first switches, all fourth switches and all sixth switches are turned off and all second switches, all third switches and all fifth switches are turned on;

FIG. 2C is a schematic circuit diagram illustrating the switched tank converter of FIG. 2A, in which all first switches, all fourth switches and all sixth switches are turned off and all second switches, all third switches and all fifth switches are turned on;

FIG. 3C is a schematic circuit diagram illustrating the switched tank converter of FIG. 3A, in which all first switches, all fourth switches and all sixth switches are turned off and all second switches, all third switches and all fifth switches are turned on;

FIG. 4C is a schematic circuit diagram illustrating the switched tank converter of FIG. 4A in a first operation mode, in which all first switches, all fourth switches and all sixth switches are turned off and all second switches, all third switches and all fifth switches are turned on;

FIG. 4E is a schematic circuit diagram illustrating the switched tank converter of FIG. 4A in a second operation mode, in which the first switch of the second-stage conversion unit is continuously turned on and the second switch of the second-stage conversion unit is continuously turned off, the other first switches, all fourth switches and all sixth switches are turned off and the other second switches, all third switches and all fifth switches are turned on.

DETAILED DESCRIPTION

Figure 1A:
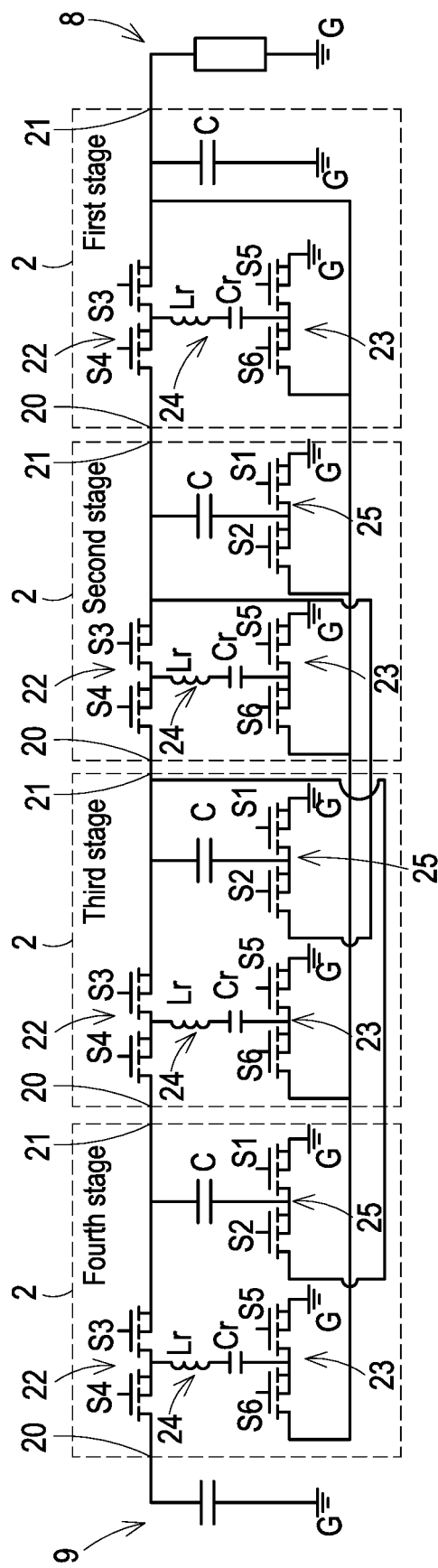
FIG. 1A is a schematic circuit diagram illustrating a switched tank converter according to a first embodiment of the present disclosure.

The present disclosure will now be described more specifically with reference to the following embodiments. It is to be noted that the following descriptions of some embodiments of this disclosure are presented herein for purpose of illustration and description only. It is not intended to be exhaustive or to be limited to the precise form disclosed.

An object of the present disclosure provides a switched tank converter. The switched tank converter has an N-stage conversion structure to achieve the highest transformer ratio of $2^N$. In case that the high transformer ratio is required, the circuitry of the switched tank converter is simplified and cost-effective.

Another object of the present disclosure provides a switched tank converter with a plurality of conversion units. The conversion units are classified into first-type conversion units and second-type conversion units. As the numbers of the first-type conversion unit and the second-type conversion unit or the connecting relationships are changed, different transformer ratios can be achieved. Moreover, one or more different DC voltages are outputted according to the number of the first-type conversion units. As the method of controlling the switches is changed, the transformer ratio of the switched tank converter can be dynamically adjusted.

The present disclosure provides a switched tank converter. For example, the switched tank converter is a DC/DC switched tank converter. The switched tank converter includes N conversion units, which are arranged in N stages, wherein N is an integer larger than or equal to 3. Each conversion unit is a first-type conversion unit or a second-type conversion unit. Regardless of the type of the conversion unit, each conversion unit includes an input end, an output end, a support capacitor, a half-bridge inverter circuit, a half-bridge rectifier circuit and a resonant circuit. The support capacitor has a first end and a second end. The first end of the support capacitor is electrically connected with the output end of the corresponding conversion unit. The half-bridge inverter circuit has a first end and a second end. The first end of the half-bridge inverter circuit is electrically connected with the input end of the corresponding conversion unit. The second end of the half-bridge inverter circuit is electrically connected with the output end of the corresponding conversion unit. The half-bridge rectifier circuit has a first end and a second end. The first end of the half-bridge rectifier circuit is electrically connected with a ground end. The second end of the half-bridge rectifier circuit of each conversion unit is electrically connected with the first end of the support capacitor of the first-stage conversion unit. The resonant circuit has a first end and a second end. The first end of the resonant circuit is electrically connected with a middle point of the half-bridge inverter circuit. The second end of the resonant circuit is electrically connected with a middle point of the half-bridge rectifier circuit. The second end of the support capacitor of each first-type conversion unit is electrically connected with the ground end. Each second-type conversion unit includes a half-bridge clamping circuit. A first end of the half-bridge clamping circuit is electrically connected with the ground end. A middle point of the half-bridge clamping circuit is electrically connected with the second end of the support capacitor of the corresponding second-type conversion unit. The output end of each conversion unit is electrically connected with the input end of a next-stage conversion unit. The output end of the first-stage conversion unit is electrically connected with a load end. The first-stage conversion unit is the first-type conversion unit. The input end of the Nth-stage conversion unit is electrically connected with a power end. Moreover, at least one conversion unit of the third-stage conversion unit to the Nth-stage conversion unit is the second-type conversion unit. The second end of the half-bridge clamping circuit of each second-type conversion unit of the second-stage conversion unit to the Nth-stage conversion unit is electrically connected with the first end of the support capacitor of the lower-stage conversion unit. The second end of the half-bridge clamping circuit of at least one second-type conversion unit of the third-stage conversion unit to the Nth-stage conversion unit is not electrically connected with the first end of the support capacitor of the first-stage conversion unit.

The concepts of the switched tank converter will be described as follows. In the following embodiments, similar component parts and elements are designated by identical numeral references.

FIG. 1A is a schematic circuit diagram illustrating a switched tank converter according to a first embodiment of the present disclosure. As shown in FIG. 1A, the switched tank converter 1 is electrically connected between a load end 8 and a power end 9. The switched tank converter 1 includes N conversion units 2, which are arranged in N stages. That is, the switched tank converter 1 has an N-stage conversion structure, wherein N is an integer larger than or equal to 3. Each conversion unit 2 is operated at a variable frequency or a fixed frequency. In this embodiment, the switched tank converter 1 has a 4-stage conversion structure with four conversion units 2. The first-stage conversion unit 2 is electrically connected with the load end 8. The last-stage conversion unit 2 is electrically connected with the power end 9. That is, the four conversion units 2 include a first-stage conversion unit 2, a second-stage conversion unit 2, a third-stage conversion unit 2 and a fourth-stage conversion unit 2 from right to left of FIG. 1A. Each of the four conversion units 2 includes an input end 20, an output end 21, a support capacitor C, a half-bridge inverter circuit 22, a half-bridge rectifier circuit 23 and a resonant circuit 24. The support capacitor C has a first end and a second end. The first end of the support capacitor C is electrically connected with the output end 21 of the corresponding conversion unit 2. The half-bridge inverter circuit 22 has a first end and a second end. The first end of the half-bridge inverter circuit 22 is electrically connected with the input end 20 of the corresponding conversion unit 2. The second end of the half-bridge inverter circuit 22 is electrically connected with the output end 21 of the corresponding conversion unit 2. The half-bridge rectifier circuit 23 has a first end and a second end. The first end of the half-bridge rectifier circuit 23 of each conversion unit 2 is electrically connected with a ground end. The second end of the half-bridge rectifier circuit 23 of each conversion unit 2 is electrically connected with the first end of the support capacitor C of the first-stage conversion unit 2. The resonant circuit 24 has a first end and a second end. The first end of the resonant circuit 24 is electrically connected with a middle point of the half-bridge inverter circuit 22. The second end of the resonant circuit 24 is electrically connected with a middle point of the half-bridge rectifier circuit 23.

In this embodiment, the first-stage conversion unit 2 is a first-type conversion unit. Consequently, the second end of the support capacitor C of the first-stage conversion unit 2 is electrically connected with the ground end G The second-stage conversion unit 2, the third-stage conversion unit 2 and the fourth-stage conversion unit 2 are second-type conversion units. In this embodiment, each of the second-stage conversion unit 2, the third-stage conversion unit 2 and the fourth-stage conversion unit 2 further includes a half-bridge clamping circuit 25. A first end of the half-bridge clamping circuit 25 is electrically connected with the ground end G A middle point of the half-bridge clamping circuit 25 is electrically connected with the second end of the support capacitor C of the corresponding conversion unit 2.

Moreover, the output end 21 of each conversion unit 2 is electrically connected with the input end 20 of the next-stage conversion unit 2. That is, the output end 21 of the fourth-stage conversion unit 2 is electrically connected with the input end 20 of the third-stage conversion unit 2, the output end 21 of the third-stage conversion unit 2 is electrically connected with the input end 20 of the second-stage conversion unit 2, and the output end 21 of the second-stage conversion unit 2 is electrically connected with the input end 20 of the first-stage conversion unit 2. The output end 21 of the first-stage conversion unit 2 is electrically connected with the load end 8. Consequently, the DC voltage of the support capacitor C of the first-stage conversion unit 2 is equal to the DC voltage of the load end 8. The second end of the half-bridge clamping circuit 25 of the third-stage conversion unit 2 is electrically connected with the first end of the support capacitor C of the second-stage conversion unit 2. The second end of the half-bridge clamping circuit 25 of the fourth-stage conversion unit 2 is electrically connected with the first end of the support capacitor C of the third-stage conversion unit 2. The second end of the half-bridge clamping circuit 25 of the second-stage conversion unit 2 is electrically connected with the first end of the support capacitor C of the first-stage conversion unit 2.

In this embodiment, each half-bridge clamping circuit 25 includes a first switch S1 and a second switch S2, which have a complementary switch configuration. The first switch S1 is electrically connected between the first end of the half-bridge clamping circuit 25 and the second switch S2. The second switch S2 is electrically connected between the second end of the half-bridge clamping circuit 25 and the first switch S1. Each half-bridge inverter circuit 22 includes a third switch S3 and a fourth switch S4, which have a complementary switch configuration. The third switch S3 is electrically connected between the fourth switch S4 and the second end of the half-bridge inverter circuit 22. The fourth switch S4 is electrically connected between the third switch S3 and the first end of the half-bridge inverter circuit 22. Each half-bridge rectifier circuit 23 includes a fifth switch S5 and a sixth switch S6, which have a complementary switch configuration. The fifth switch S5 is electrically connected between the sixth switch S6 and the first end of the half-bridge rectifier circuit 23. The sixth switch S6 is electrically connected between the fifth switch S5 and the second end of the half-bridge rectifier circuit 23.

The third switches S3 of all conversion units 2, the fifth switches S5 of all conversion units 2 and the second switches S2 of the second-type conversion units 2 (e.g., the second-stage conversion unit 2 to the fourth-stage conversion unit 2) are synchronously turned on and synchronously turned off. The fourth switches S4 of all conversion units 2, the sixth switches S6 of all conversion units 2 and the first switches S1 of the second-type conversion units 2 (e.g., the second-stage conversion unit 2 to the fourth-stage conversion unit 2) are synchronously turned on and synchronously turned off. In case that the dead time is ignored, the duty cycle of each of the switches S1, S2, S3, S4, S5 and S6 is 50%.

In this embodiment, the resonant circuit 24 includes a resonant inductor Lr and a resonant capacitor Cr. The resonant inductor Lr and the resonant capacitor Cr are connected with each other in series. In another embodiment, the resonant circuit 24 is an equivalent circuit of a resonant inductor Lr and a resonant capacitor Cr in serial connection.

Alternatively, the resonant circuit 24 includes one of a resonant inductor Lr and a resonant capacitor Cr.

The operations of the switched tank converter 1 will be described as follows.

Figure 1B:
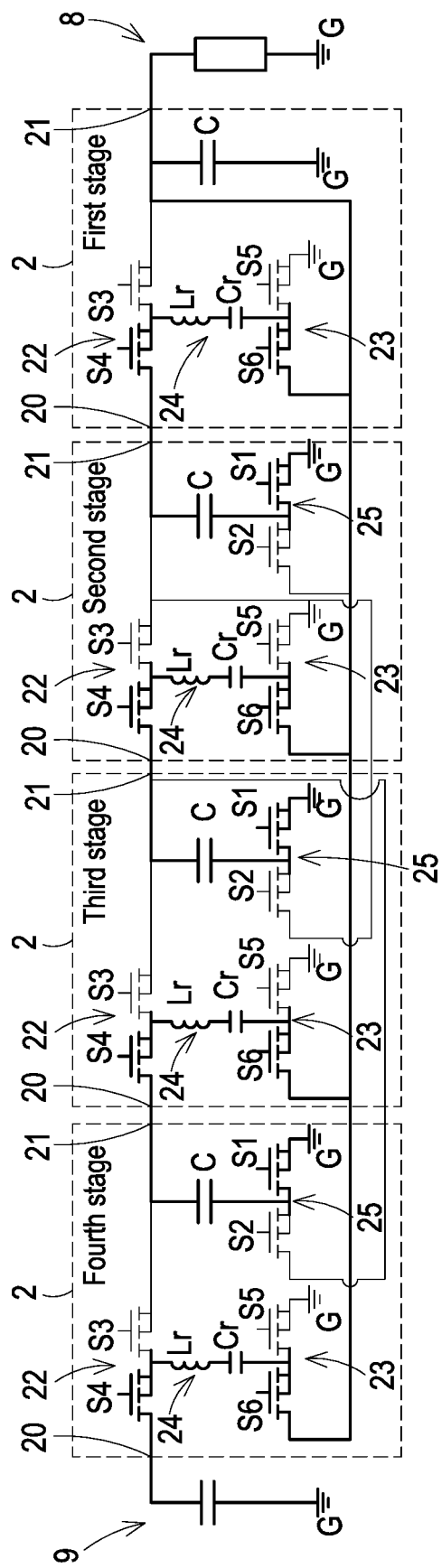
FIG. 1B is a schematic circuit diagram illustrating the switched tank converter of FIG. 1A, in which all first switches, all fourth switches and all sixth switches are turned on and all second switches, all third switches and all fifth switches are turned off.
Figure 1C:
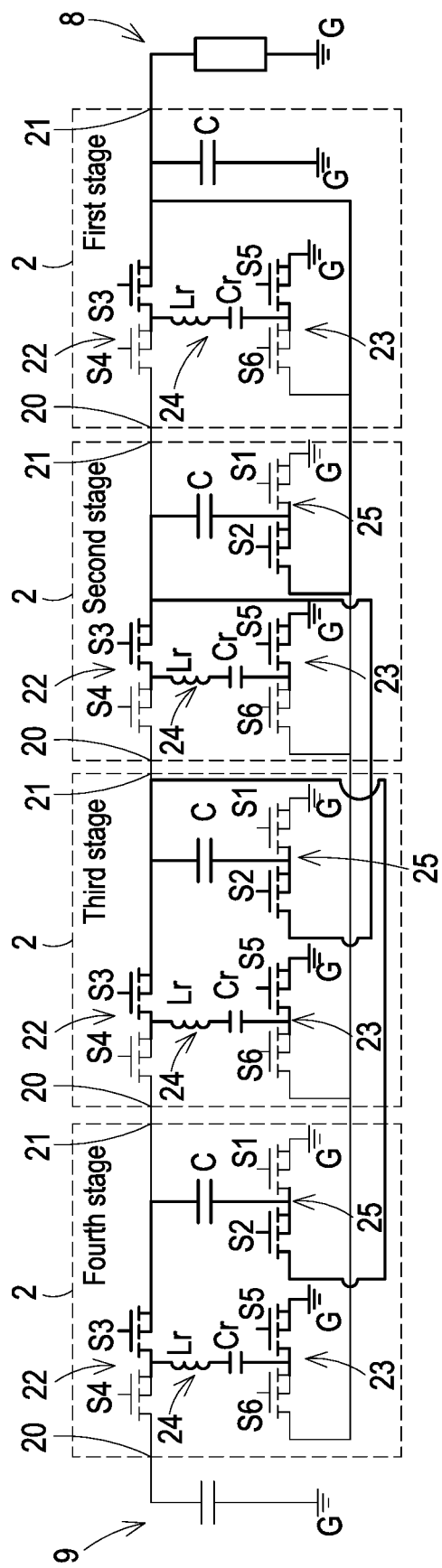

Please refer to FIGS. 1B and 1C. FIG. 1B is a schematic circuit diagram illustrating the switched tank converter of FIG. 1A, in which all first switches S1, all fourth switches S4 and all sixth switches S6 are turned on and all second switches S2, all third switches S3 and all fifth switches S5 are turned off. FIG. 1C is a schematic circuit diagram illustrating the switched tank converter of FIG. 1A, in which all first switches S1, all fourth switches S4 and all sixth switches S6 are turned off and all second switches S2, all third switches S3 and all fifth switches S5 are turned on.

As shown in FIG. 1C, when the third switch S3 and the fifth switch S5 of the first-stage conversion unit 2 are turned on, the resonant capacitor Cr of the first-stage conversion unit 2 discharges electric energy to the support capacitor C of the first-stage conversion unit 2. In the steady state, the DC voltage of the resonant capacitor Cr of the first-stage conversion unit 2 is equal to the DC voltage of the support capacitor C of the first-stage conversion unit 2. For example, the DC voltage of the support capacitor C of the first-stage conversion unit 2 is Vo.

As shown in FIG. 1B, when the first switch S1 of the second-stage conversion unit 2 and the fourth switch S4 and the sixth switch S6 of the first-stage conversion unit 2 are turned on, the support capacitor C of the second-stage conversion unit 2 discharges electric energy to the resonant capacitor Cr and the support capacitor C of the first-stage conversion unit 2. In the steady state, the DC voltage of the resonant capacitor Cr of the first-stage conversion unit 2 is equal to the DC voltage of the support capacitor C of the first-stage conversion unit 2 (i.e., Vo). According to Kirchhoff's Voltage Law (KVL), the DC voltage of the support capacitor C of the second-stage conversion unit 2 is equal to the sum of the DC voltages of the resonant capacitor Cr and the support capacitor C of the first-stage conversion unit 2. That is, the DC voltage of the support capacitor C of the second-stage conversion unit 2 is equal to 2Vo.

As shown in FIG. 1C, when the second switch S2, the third switch S3 and the fifth switch S5 of the second-stage conversion unit 2 are turned on, the resonant capacitor Cr of the second-stage conversion unit 2 discharges electric energy to the support capacitor C of the second-stage conversion unit 2 and the support capacitor C of the first-stage conversion unit 2. In the steady state, the DC voltage of the support capacitor C of the first-stage conversion unit 2 is equal to Vo, and the DC voltage of the support capacitor C of the second-stage conversion unit 2 is equal to 2Vo. According to Kirchhoff's Voltage Law, the DC voltage of the resonant capacitor Cr of the second-stage conversion unit 2 is equal to the sum of the DC voltage of the support capacitor C of the second-stage conversion unit 2 and the DC voltage of the support capacitor C of the first-stage conversion unit 2. That is, the DC voltage of the resonant capacitor Cr of the second-stage conversion unit 2 is equal to 3Vo.

As shown in FIG. 1B, when the first switch S1 of the third-stage conversion unit 2 and the fourth switch S4 and the sixth switch S6 of the second-stage conversion unit 2 are turned on, the support capacitor C of the third-stage conversion unit 2 discharges electric energy to the resonant capacitor Cr of the second-stage conversion unit 2 and the support capacitor C of the first-stage conversion unit 2. In the steady state, the DC voltage of the resonant capacitor Cr of the second-stage conversion unit 2 is equal to 3Vo, and the DC voltage of the support capacitor C of the first-stage conversion unit 2 is equal to Vo. According to Kirchhoff's Voltage Law, the DC voltage of the support capacitor C of the third-stage conversion unit 2 is equal to the sum of the DC voltage of the resonant capacitor Cr of the second-stage conversion unit 2 and the DC voltage of the support capacitor C of the first-stage conversion unit 2. That is, the DC voltage of the support capacitor C of the third-stage conversion unit 2 is equal to 4Vo.

As shown in FIG. 1C, when the second switch S2, the third switch S3 and the fifth switch S5 of the third-stage conversion unit 2 and the second switch S2 of the second-stage conversion unit 2 are turned on, the resonant capacitor Cr of the third-stage conversion unit 2 discharges electric energy to the support capacitor C of the third-stage conversion unit 2, the support capacitor C of the second-stage conversion unit 2 and the support capacitor C of the first-stage conversion unit 2. In the steady state, the DC voltage of the support capacitor C of the first-stage conversion unit 2 is equal to Vo, the DC voltage of the support capacitor C of the second-stage conversion unit 2 is equal to 2Vo, and the DC voltage of the support capacitor C of the third-stage conversion unit 2 is equal to 4Vo. According to Kirchhoff's Voltage Law, the DC voltage of the resonant capacitor Cr of the third-stage conversion unit 2 is equal to the sum of the DC voltage of the support capacitor C of the third-stage conversion unit 2, the DC voltage of the support capacitor C of the second-stage conversion unit 2 and the DC voltage of the support capacitor C of the first-stage conversion unit 2. That is, the DC voltage of the resonant capacitor Cr of the third-stage conversion unit 2 is equal to 7Vo.

As shown in FIG. 1B, when the first switch S1 of the fourth-stage conversion unit 2 and the fourth switch S4 and the sixth switch S6 of the third-stage conversion unit 2 are turned on, the support capacitor C of the fourth-stage conversion unit 2 discharges electric energy to the resonant capacitor Cr of the third-stage conversion unit 2 and the support capacitor C of the first-stage conversion unit 2. In the steady state, the DC voltage of the resonant capacitor Cr of the third-stage conversion unit 2 is equal to 7Vo, and the DC voltage of the support capacitor C of the first-stage conversion unit 2 is equal to Vo. According to Kirchhoff's Voltage Law, the DC voltage of the support capacitor C of the fourth-stage conversion unit 2 is equal to the sum of the DC voltage of the resonant capacitor Cr of the third-stage conversion unit 2 and the DC voltage of the support capacitor C of the first-stage conversion unit 2. That is, the DC voltage of the support capacitor C of the fourth-stage conversion unit 2 is equal to 8Vo.

As shown in FIG. 1C, when the second switch S2, the third switch S3 and the fifth switch S5 of the fourth-stage conversion unit 2, the second switch S2 of the third-stage conversion unit 2 and the second switch S2 of the second-stage conversion unit 2 are turned on, the resonant capacitor Cr of the fourth-stage conversion unit 2 discharges electric energy to the support capacitor C of the fourth-stage conversion unit 2, the support capacitor C of the third-stage conversion unit 2, the support capacitor C of the second-stage conversion unit 2 and the support capacitor C of the first-stage conversion unit 2. In the steady state, the DC voltage of the support capacitor C of the first-stage conversion unit 2 is equal to Vo, the DC voltage of the support capacitor C of the second-stage conversion unit 2 is equal to 2Vo, the DC voltage of the support capacitor C of the third-stage conversion unit 2 is equal to 4Vo, and the DC voltage of the support capacitor C of the fourth-stage conversion unit 2 is equal to 8Vo. According to Kirchhoff's Voltage Law, the DC voltage of the resonant capacitor Cr of the fourth-stage conversion unit 2 is equal to the sum of the DC voltage of the support capacitor C of the fourth-stage conversion unit 2, the DC voltage of the support capacitor C of the third-stage conversion unit 2, the DC voltage of the support capacitor C of the second-stage conversion unit 2 and the DC voltage of the support capacitor C of the first-stage conversion unit 2. That is, the DC voltage of the resonant capacitor Cr of the fourth-stage conversion unit 2 is equal to 15Vo.

As shown in FIG. 1B, when the fourth switch S4 and the sixth switch S6 of the fourth-stage conversion unit 2 are turned on, the support capacitor C of the power end 9 discharges electric energy to the resonant capacitor Cr of the fourth-stage conversion unit 2 and the support capacitor C of the first-stage conversion unit 2. In the steady state, the DC voltage of the resonant capacitor Cr of the fourth-stage conversion unit 2 is equal to 15Vo, and the DC voltage of the support capacitor C of the first-stage conversion unit 2 is equal to Vo. According to Kirchhoff's Voltage Law, the DC voltage of the power end 9 is equal to the sum of the DC voltage of the resonant capacitor Cr of the fourth-stage conversion unit 2 and the DC voltage of the support capacitor C of the first-stage conversion unit 2. That is, the DC voltage of the power end 9 is equal to 16Vo.

As mentioned above, the conventional first-type switched tank converter needs a 15-stage conversion structure to achieve the transformer ratio of 16:1, and the conventional second-type switched tank converter needs an 8-stage conversion structure to achieve the transformer ratio of 16:1. In the first embodiment of the present disclosure, the switched tank converter 1 needs a 4-stage conversion structure to achieve the transformer ratio of 16:1. In other words, the circuitry of the switched tank converter 1 is simplified and cost-effective.

From the above descriptions, the switched tank converter 1 has an N-stage conversion structure. The first-stage conversion unit 2 is the first-type conversion unit 2. Each of the second-stage conversion unit 2 to the Nth-stage conversion unit 2 is the second-type conversion unit 2. In case that the second end of the half-bridge clamping circuit 25 of each conversion unit 2 is electrically connected with the first end of the support capacitor C of the next-stage conversion unit C, the switched tank converter 1 has the highest transformer ratio (i.e., $2^N$). The conventional switched tank converter can achieve the highest transformer ratio of (N+1) or 2N. In case that the high transformer ratio is required, the circuitry of the switched tank converter 1 is simplified and cost-effective.

Figure 2A:
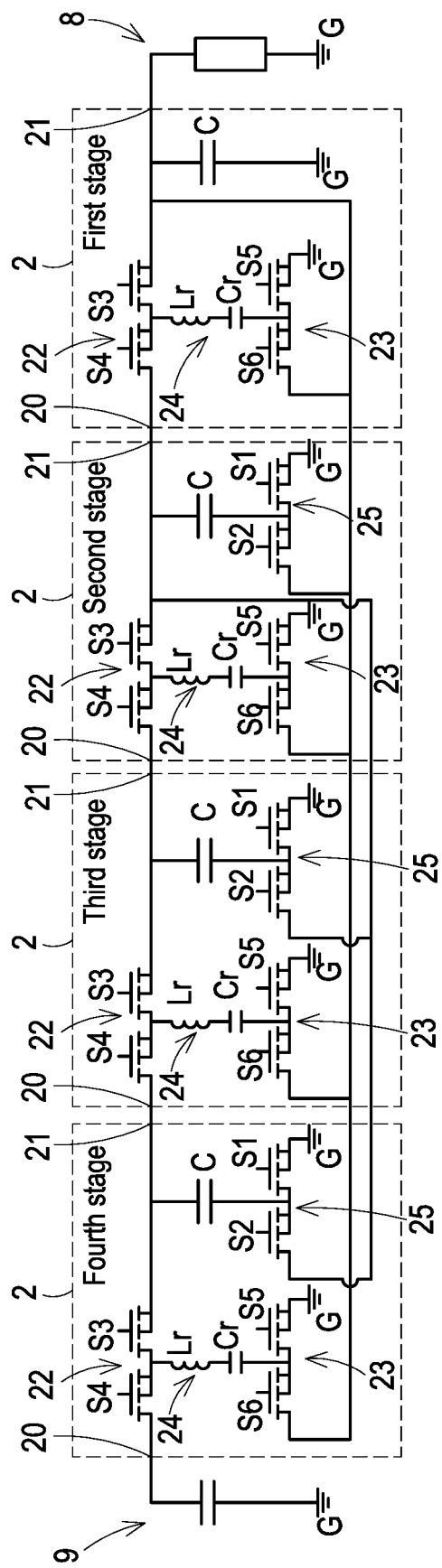
FIG. 2A is a schematic circuit diagram illustrating a switched tank converter according to a second embodiment of the present disclosure.

FIG. 2A is a schematic circuit diagram illustrating a switched tank converter according to a second embodiment of the present disclosure. In this embodiment, the switched tank converter 3 has a 4-stage conversion structure with four conversion units 2. Like the first embodiment, the first-stage conversion unit 2 is a first-type conversion unit, and the second-stage conversion unit 2, the third-stage conversion unit 2 and the fourth-stage conversion unit 2 are second-type conversion units. In comparison with the first embodiment, the connection relationship between the half-bridge clamping circuit 25 and the support capacitor C is distinguished. In the second-stage conversion unit to the Nth-stage conversion unit of the switched tank converter 1 of the first embodiment, the second end of the half-bridge clamping circuit 25 of the each conversion unit 2 is electrically connected with the first end of the support capacitor C of the next-stage conversion unit. That is, the second end of the half-bridge clamping circuit 25 of the third-stage conversion unit 2 is electrically connected with the first end of the support capacitor C of the second-stage conversion unit 2, and the second end of the half-bridge clamping circuit 25 of the fourth-stage conversion unit 2 is electrically connected with the first end of the support capacitor C of the third-stage conversion unit 2. In the switched tank converter 3 of this embodiment, the second end of the half-bridge clamping circuit 25 of the fourth-stage conversion unit 2 is electrically connected with the first end of the support capacitor C of the second-stage conversion unit 2.

The operations of the switched tank converter 3 will be described as follows.

Figure 2B:
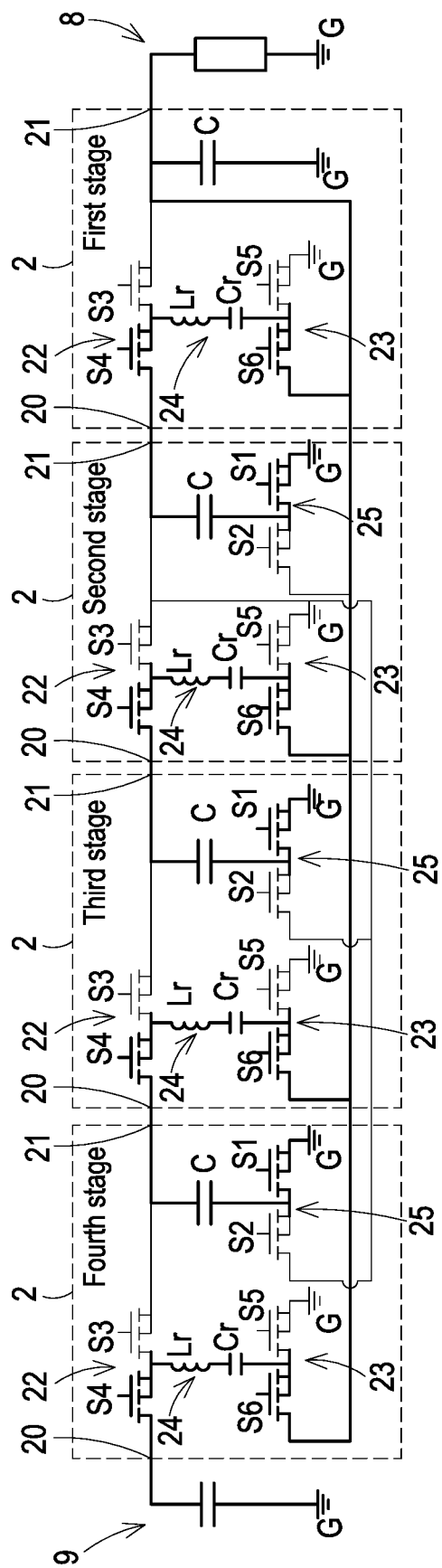
FIG. 2B is a schematic circuit diagram illustrating the switched tank converter of FIG. 2A, in which all first switches, all fourth switches and all sixth switches are turned on and all second switches, all third switches and all fifth switches are turned off.
Figure 2C:
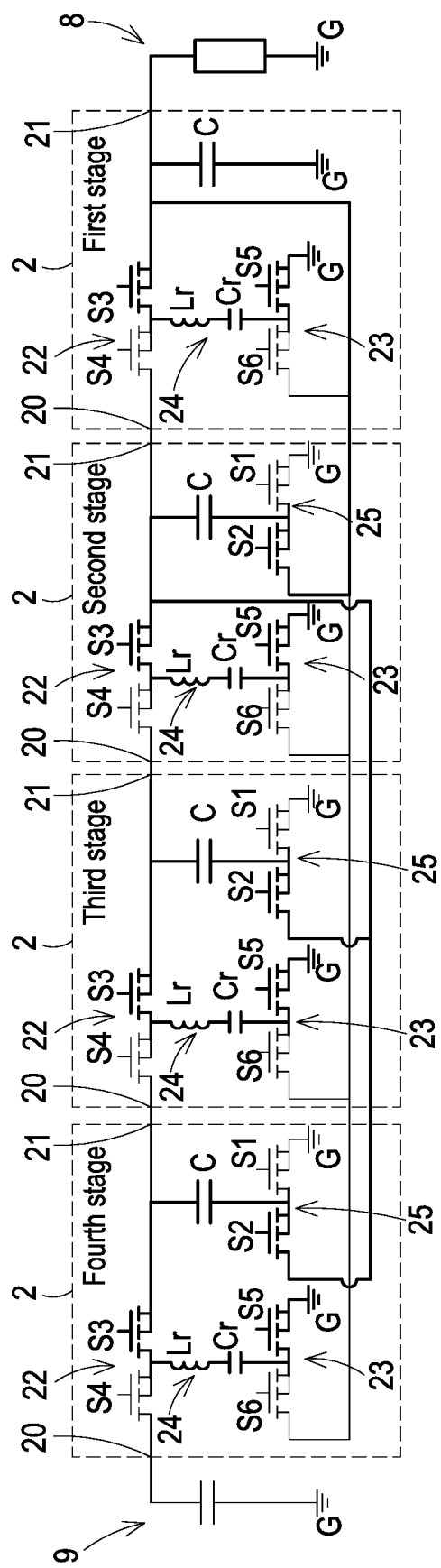

Please refer to FIGS. 2B and 2C. FIG. 2B is a schematic circuit diagram illustrating the switched tank converter of FIG. 2A, in which all first switches, all fourth switches and all sixth switches are turned on and all second switches, all third switches and all fifth switches are turned off. FIG. 2C is a schematic circuit diagram illustrating the switched tank converter of FIG. 2A, in which all first switches, all fourth switches and all sixth switches are turned off and all second switches, all third switches and all fifth switches are turned on.

As shown in FIG. 2C, when the third switch S3 and the fifth switch S5 of the first-stage conversion unit 2 are turned on, the resonant capacitor Cr of the first-stage conversion unit 2 discharges electric energy to the support capacitor C of the first-stage conversion unit 2. In the steady state, the DC voltage of the resonant capacitor Cr of the first-stage conversion unit 2 is equal to the DC voltage of the support capacitor C of the first-stage conversion unit 2. For example, the DC voltage of the support capacitor C of the first-stage conversion unit 2 is Vo.

As shown in FIG. 2B, when the first switch S1 of the second-stage conversion unit 2 and the fourth switch S4 and the sixth switch S6 of the first-stage conversion unit 2 are turned on, the support capacitor C of the second-stage conversion unit 2 discharges electric energy to the resonant capacitor Cr and the support capacitor C of the first-stage conversion unit 2. In the steady state, the DC voltage of the resonant capacitor Cr of the first-stage conversion unit 2 is equal to the DC voltage of the support capacitor C of the first-stage conversion unit 2 (i.e., Vo). According to Kirchhoff's Voltage Law (KVL), the DC voltage of the support capacitor C of the second-stage conversion unit 2 is equal to the sum of the DC voltages of the resonant capacitor Cr and the support capacitor C of the first-stage conversion unit 2. That is, the DC voltage of the support capacitor C of the second-stage conversion unit 2 is equal to 2Vo. The rest may be deduced by analogy. That is, the DC voltage of the power end 9 is equal to 12Vo. In the second embodiment of the present disclosure, the 4-stage conversion structure of the switched tank converter 3 achieves the transformer ratio of 12:1.

In the first embodiment, the switched tank converter 1 achieves the transformer ratio of 16:1. In the second embodiment, the switched tank converter 3 achieves the transformer ratio of 12:1. In case that the switched tank converter has N-stage conversion structure (N is at least 3) with the first-type conversion unit and the second-type conversion unit, the transformer ratio is adjustable according to the result of judging whether the second end of the half-bridge clamping circuit 25 of any second-type conversion unit 2 of the third-stage conversion unit 2 to the Nth-stage conversion unit 2 is electrically connected with the first end of the support capacitor C of the next-stage conversion unit 2. Consequently, even if the stage number of the switched tank converter is identical, the transformer ratio is diversified.

In some embodiments, the second-stage conversion unit 2 is the first-type conversion unit or the second-type conversion unit. In case that the second-stage conversion unit 2 is the second-type conversion unit, the second end of the half-bridge clamping circuit 25 of the second-stage conversion unit 2 is electrically connected with the first end of the support capacitor C of the first-stage conversion unit 2. Moreover, at least one of the conversion units 2 of the third-stage conversion unit 2 to the Nth-stage conversion unit 2 is the second-type conversion unit, and the other conversion units are the first-type conversion units. The second end of the half-bridge clamping circuit 25 of each second-type conversion unit 2 is electrically connected with the first end of the support capacitor C of the lower-stage conversion unit. However, the second end of the half-bridge clamping circuit 25 of at least one second-type conversion unit 2 is not electrically connected with the first end of the support capacitor C of the first-stage conversion unit 2.

Figure 3A:
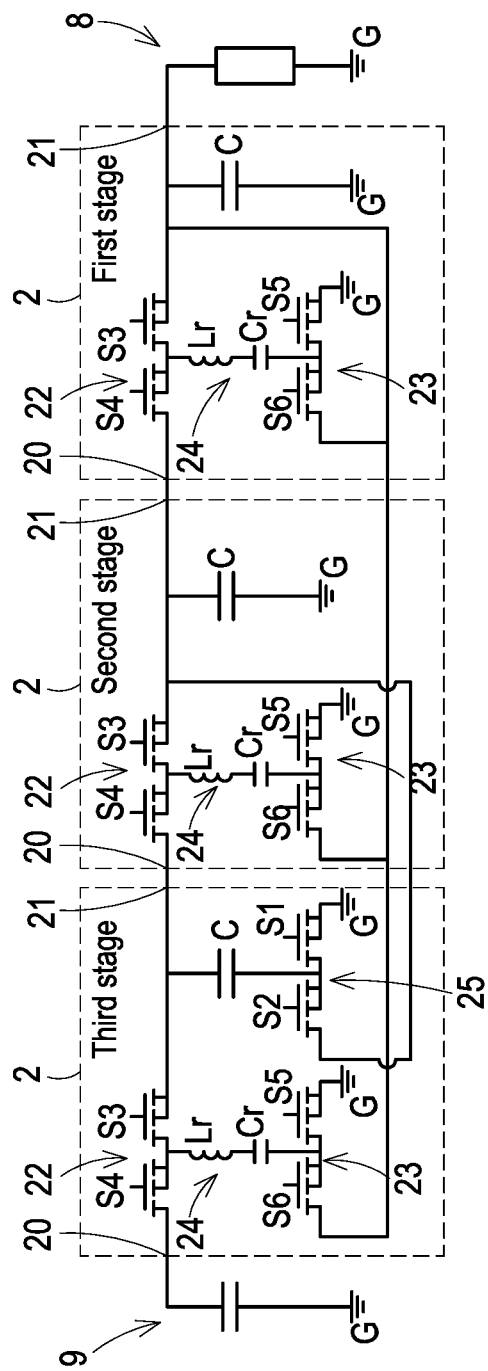
FIG. 3A is a schematic circuit diagram illustrating a switched tank converter according to a third embodiment of the present disclosure.

FIG. 3A is a schematic circuit diagram illustrating a switched tank converter according to a third embodiment of the present disclosure. In this embodiment, the switched tank converter 4 has a 3-stage conversion structure with three conversion units 2. The first-stage conversion unit 2 and the second-stage conversion unit 2 are first-type conversion units, and the third-stage conversion unit 2 is a second-type conversion unit 2. The second end of the half-bridge clamping circuit 25 of the third-stage conversion unit 2 is electrically connected with the first end of the support capacitor C of the second-stage conversion unit 2.

The operations of the switched tank converter 4 will be described as follows.

Figure 3B:
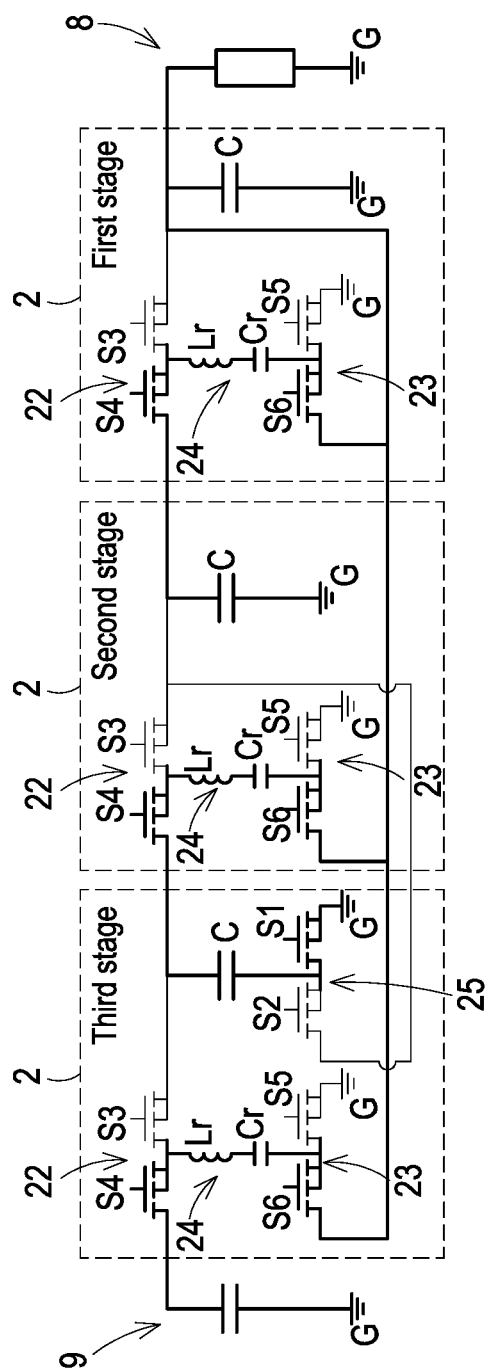
FIG. 3B is a schematic circuit diagram illustrating the switched tank converter of FIG. 3A, in which all first switches, all fourth switches and all sixth switches are turned on and all second switches, all third switches and all fifth switches are turned off.
Figure 3C:
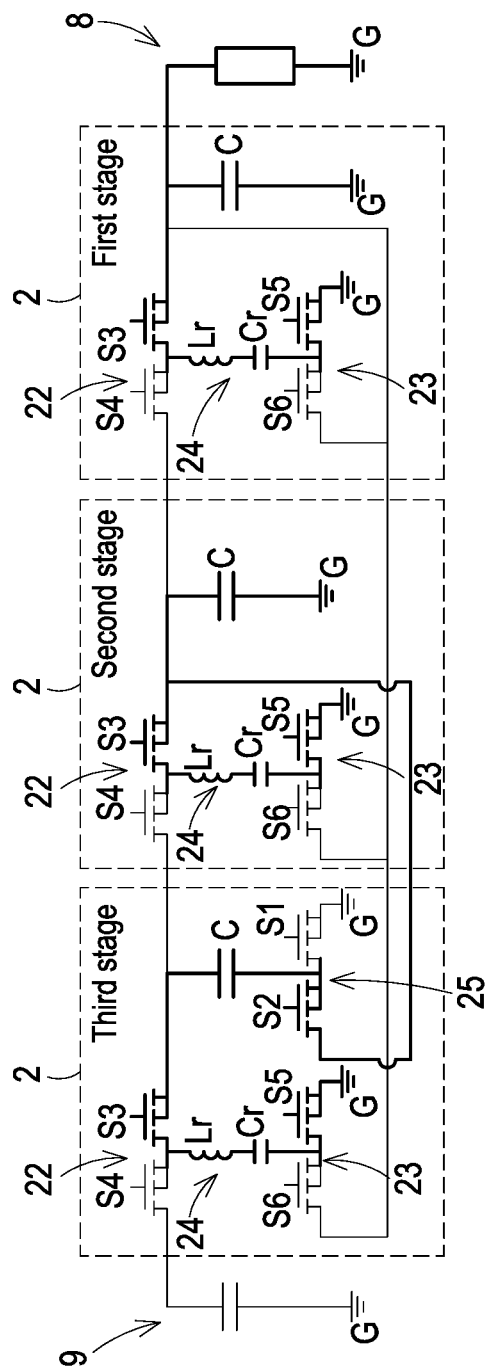

Please refer to FIGS. 3B and 3C. FIG. 3B is a schematic circuit diagram illustrating the switched tank converter of FIG. 3A, in which all first switches, all fourth switches and all sixth switches are turned on and all second switches, all third switches and all fifth switches are turned off. FIG. 3C is a schematic circuit diagram illustrating the switched tank converter of FIG. 3A, in which all first switches, all fourth switches and all sixth switches are turned off and all second switches, all third switches and all fifth switches are turned on.

As shown in FIG. 3C, when the third switch S3 and the fifth switch S5 of the first-stage conversion unit 2 are turned on, the resonant capacitor Cr of the first-stage conversion unit 2 discharges electric energy to the support capacitor C of the first-stage conversion unit 2. In the steady state, the DC voltage of the resonant capacitor Cr of the first-stage conversion unit 2 is equal to the DC voltage of the support capacitor C of the first-stage conversion unit 2. For example, the DC voltage of the support capacitor C of the first-stage conversion unit 2 is Vo.

As shown in FIG. 3B, when the fourth switch S4 and the sixth switch S6 of the first-stage conversion unit 2 are turned on, the support capacitor C of the second-stage conversion unit 2 discharges electric energy to the resonant capacitor Cr and the support capacitor C of the first-stage conversion unit 2. In the steady state, the DC voltage of the resonant capacitor Cr of the first-stage conversion unit 2 is equal to the DC voltage of the support capacitor C of the first-stage conversion unit 2 (i.e., Vo). According to Kirchhoff's Voltage Law, the DC voltage of the support capacitor C of the second-stage conversion unit 2 is equal to the sum of the DC voltages of the resonant capacitor Cr and the support capacitor C of the first-stage conversion unit 2. That is, the DC voltage of the support capacitor C of the second-stage conversion unit 2 is equal to 2Vo.

As shown in FIG. 3C, when the third switch S3 and the fifth switch S5 of the second-stage conversion unit 2 are turned on, the resonant capacitor Cr of the second-stage conversion unit 2 discharges electric energy to the support capacitor C of the second-stage conversion unit 2. In the steady state, the DC voltage of the support capacitor C of the second-stage conversion unit 2 is 2Vo, the DC voltage of the resonant capacitor Cr of the second-stage conversion unit 2 is equal to the DC voltage of the support capacitor C of the second-stage conversion unit 2. That is, the DC voltage of the resonant capacitor Cr of the second-stage conversion unit 2 is 2Vo.

As shown in FIG. 3B, when the first switch S1 of the third-stage conversion unit 2 and the fourth switch S4 and the sixth switch S6 of the second-stage conversion unit 2 are turned on, the support capacitor C of the third-stage conversion unit 2 discharges electric energy to the resonant capacitor Cr of the second-stage conversion unit 2 and the support capacitor C of the first-stage conversion unit 2. In the steady state, the DC voltage of the resonant capacitor Cr of the second-stage conversion unit 2 is equal to 2Vo, and the DC voltage of the support capacitor C of the first-stage conversion unit 2 is equal to Vo. According to Kirchhoff's Voltage Law, the DC voltage of the support capacitor C of the third-stage conversion unit 2 is equal to the sum of the DC voltage of the resonant capacitor Cr of the second-stage conversion unit 2 and the DC voltage of the support capacitor C of the first-stage conversion unit 2. That is, the DC voltage of the support capacitor C of the third-stage conversion unit 2 is equal to 3Vo.

As shown in FIG. 3C, when the second switch S2, the third switch S3 and the fifth switch S5 of the third-stage conversion unit 2 are turned on, the resonant capacitor Cr of the third-stage conversion unit 2 discharges electric energy to the support capacitor C of the third-stage conversion unit 2 and the support capacitor C of the second-stage conversion unit 2. In the steady state, the DC voltage of the support capacitor C of the second-stage conversion unit 2 is 2Vo, and the DC voltage of the support capacitor C of the third-stage conversion unit 2 is equal to 3Vo. According to Kirchhoff's Voltage Law, the DC voltage of the resonant capacitor Cr of the third-stage conversion unit 2 is equal to the sum of the DC voltage of the support capacitor C of the third-stage conversion unit 2 and the DC voltage of the support capacitor C of the second-stage conversion unit 2. That is, the DC voltage of the resonant capacitor Cr of the third-stage conversion unit 2 is equal to 5Vo.

As shown in FIG. 3B, when the fourth switch S4 and the sixth switch S6 of the third-stage conversion unit 2 are turned on, the support capacitor C of the power end 9 discharges electric energy to the resonant capacitor Cr of the third-stage conversion unit 2 and the support capacitor C of the first-stage conversion unit 2. In the steady state, the DC voltage of the resonant capacitor Cr of the third-stage conversion unit 2 is equal to 5Vo, and the DC voltage of the support capacitor C of the first-stage conversion unit 2 is equal to Vo. According to Kirchhoff's Voltage Law, the DC voltage of the power end 9 is equal to the sum of the DC voltage of the resonant capacitor Cr of the third-stage conversion unit 2 and the DC voltage of the support capacitor C of the first-stage conversion unit 2. That is, the DC voltage of the power end 9 is equal to 6Vo.

In this embodiment, the second-stage conversion unit 2 is the first-type conversion unit. That is, the second end of the support capacitor C of the second-stage conversion unit 2 is electrically connected with the ground end G The output end 21 of the first-stage conversion unit 2 outputs a DC voltage with the transformer ratio of 6:1 to the load end 8, and the output end 21 of the second-stage conversion unit 2 with the transformer ratio of 3:1 to another load end 8 (not shown). Consequently, the switched tank converter 4 can output two different DC voltages.

Even if the architecture of the switched tank converter is not changed, the method of controlling the switches may be varied to achieve different transformer ratios. In the above first controlling method, the third switches of all conversion units, the fifth switches of all conversion units and the second switches of all second-type conversion units are synchronously turned on and synchronously turned off, and the fourth switches of all conversion units, the sixth switches of all conversion units and the first switches of all second-type conversion units are synchronously turned on and synchronously turned off. Under this circumstance, a first transformer ratio is achieved. In a second controlling method, the first switch of at least one conversion unit of the second-stage conversion unit to the Nth-stage conversion unit is continuously turned on and the second switch is continuously turned off. The third switches of all conversion units, the fifth switches of all conversion units and the other second switches are synchronously turned on and synchronously turned off, and the fourth switches of all conversion units, the sixth switches of all conversion units and the other first switches are synchronously turned on and synchronously turned off. Under this circumstance, a second transformer ratio is achieved.

Figure 4A:
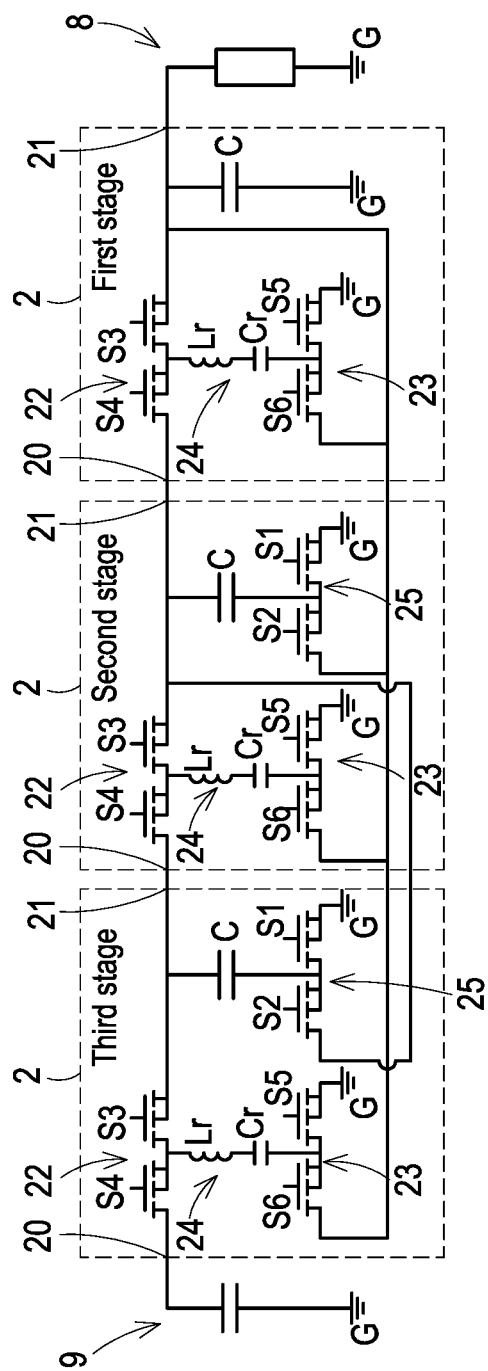
FIG. 4A is a schematic circuit diagram illustrating a switched tank converter according to a fourth embodiment of the present disclosure.

FIG. 4A is a schematic circuit diagram illustrating a switched tank converter according to a fourth embodiment of the present disclosure. In this embodiment, the switched tank converter 5 has a 3-stage conversion structure with three conversion units 2. The first-stage conversion unit 2 is a first-type conversion unit, and the second-stage conversion unit 2 and the third-stage conversion unit 2 are second-type conversion units 2. The second end of the half-bridge clamping circuit 25 of the second-stage conversion unit 2 is electrically connected with the first end of the support capacitor C of the first-stage conversion unit 2. The second end of the half-bridge clamping circuit 25 of the third-stage conversion unit 2 is electrically connected with the first end of the support capacitor C of the second-stage conversion unit 2.

Figure 4B:
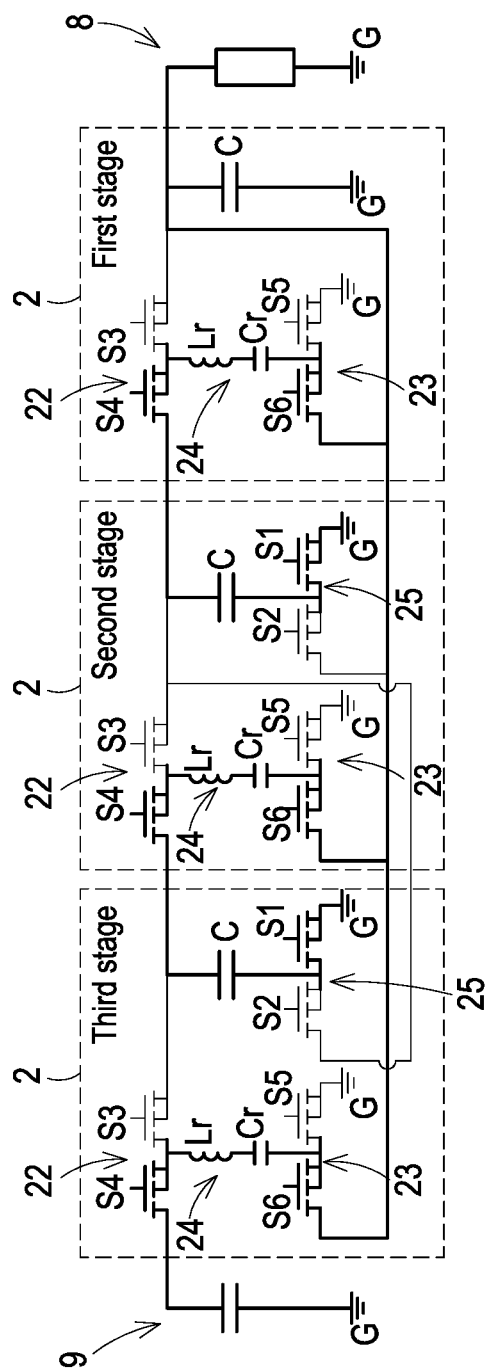
FIG. 4B is a schematic circuit diagram illustrating the switched tank converter of FIG. 4A in a first operation mode, in which all first switches, all fourth switches and all sixth switches are turned on and all second switches, all third switches and all fifth switches are turned off.
Figure 4C:
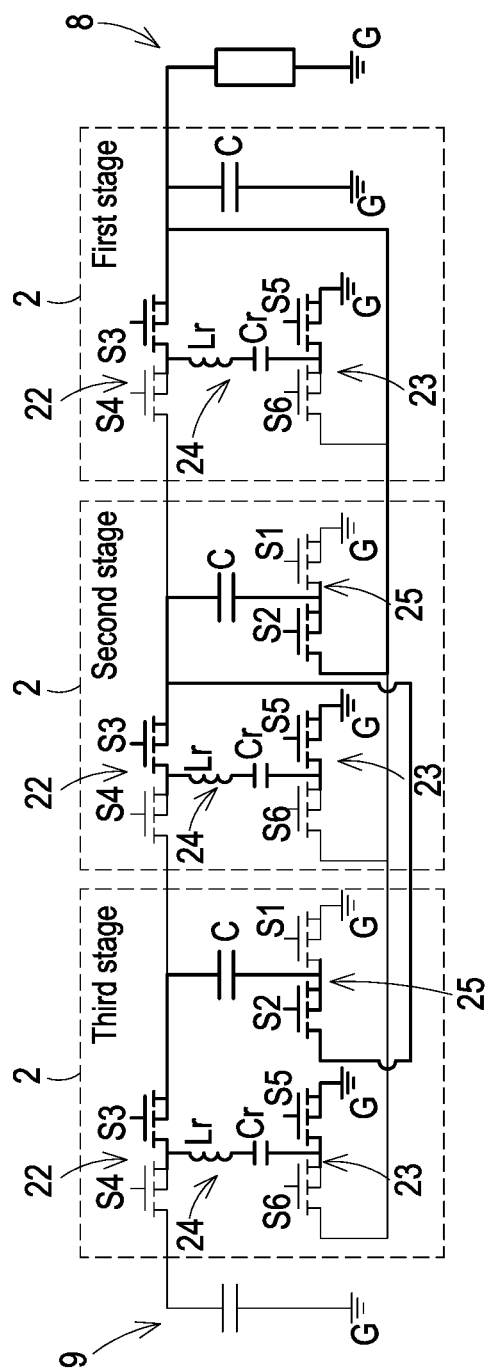

Hereinafter, the operations of the switched tank converter 5 in a first operation mode will be illustrated with reference to FIGS. 4B and 4C. FIG. 4B is a schematic circuit diagram illustrating the switched tank converter of FIG. 4A in a first operation mode, in which all first switches, all fourth switches and all sixth switches are turned on and all second switches, all third switches and all fifth switches are turned off. FIG. 4C is a schematic circuit diagram illustrating the switched tank converter of FIG. 4A in a first operation mode, in which all first switches, all fourth switches and all sixth switches are turned off and all second switches, all third switches and all fifth switches are turned on.

In the first operation mode, the operations of the switches S1-S6 are similar to those of the first, second and third embodiments. That is, the third switches S3 of all conversion units 2, the fifth switches S5 of all conversion units 2 and the second switches S2 of the second-type conversion units 2 are synchronously turned on and synchronously turned off. In addition, the fourth switches S4 of all conversion units 2, the sixth switches S6 of all conversion units 2 and the first switches S1 of the second-type conversion units 2 are synchronously turned on and synchronously turned off. Consequently, the switched tank converter 5 achieves the transformer ratio of 8:1.

Figure 4D:
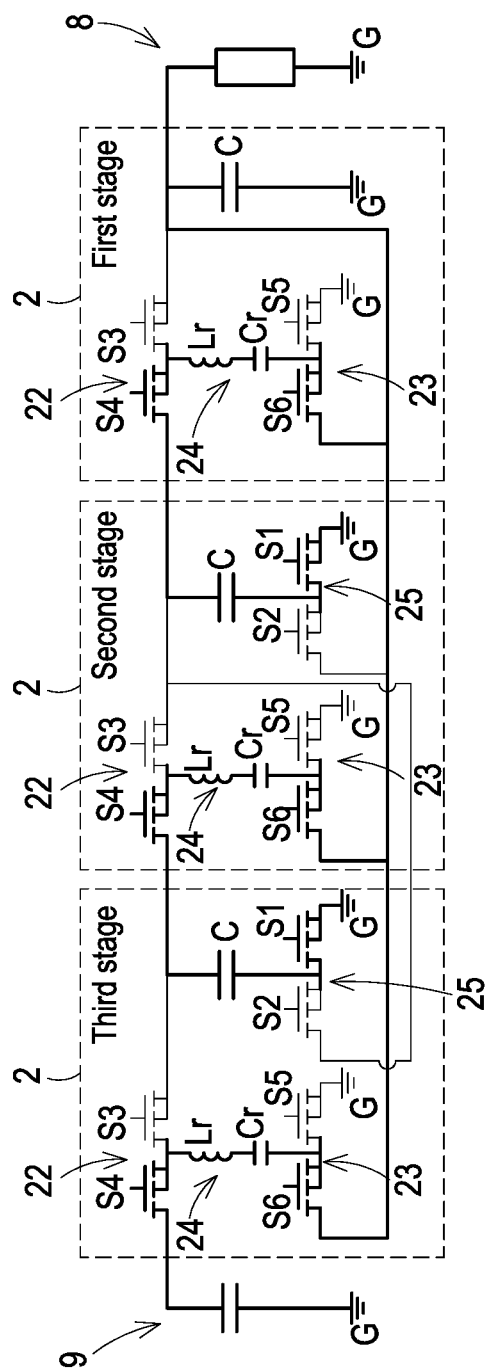
FIG. 4D is a schematic circuit diagram illustrating the switched tank converter of FIG. 4A in a second operation mode, in which the first switch of the second-stage conversion unit is continuously turned on and the second switch of the second-stage conversion unit is continuously turned off, the other first switches, all fourth switches and all sixth switches are turned on and the other second switches, all third switches and all fifth switches are turned off.
Figure 4E:
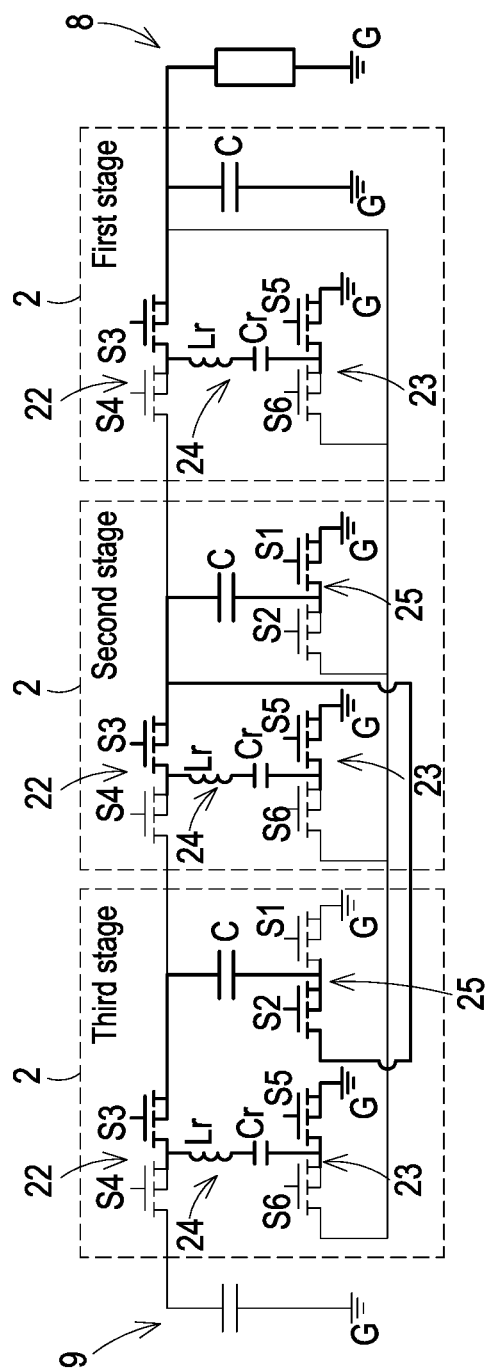

Hereinafter, the operations of the switched tank converter 5 in a second operation mode will be illustrated with reference to FIGS. 4D and 4E. FIG. 4D is a schematic circuit diagram illustrating the switched tank converter of FIG. 4A in a second operation mode, in which the first switch of the second-stage conversion unit is continuously turned on and the second switch of the second-stage conversion unit is continuously turned off, the other first switches, all fourth switches and all sixth switches are turned on and the other second switches, all third switches and all fifth switches are turned off. FIG. 4E is a schematic circuit diagram illustrating the switched tank converter of FIG. 4A in a second operation mode, in which the first switch of the second-stage conversion unit is continuously turned on and the second switch of the second-stage conversion unit is continuously turned off, the other first switches, all fourth switches and all sixth switches are turned off and the other second switches, all third switches and all fifth switches are turned on.

In the second operation mode, the first switch S1 of the second-stage conversion unit 2 is continuously turned on, and the second switch S2 of the second-stage conversion unit 2 is continuously turned off. The third switches S3 of all conversion units 2, the fifth switches S5 of all conversion units 2 and the other second switches S2 are synchronously turned on and synchronously turned off. In addition, the fourth switches S4 of all conversion units 2, the sixth switches S6 of all conversion units 2 and the other first switches S1 are synchronously turned on and synchronously turned off. When the switched tank converter 5 is in the first operation mode, the transformer ratio of 8:1. When the switched tank converter 5 is in the second operation mode, a different transformer ratio is achieved.

As shown in FIG. 4E, when the third switch S3 and the fifth switch S5 of the first-stage conversion unit 2 are turned on, the resonant capacitor Cr of the first-stage conversion unit 2 discharges electric energy to the support capacitor C of the first-stage conversion unit 2. In the steady state, the DC voltage of the resonant capacitor Cr of the first-stage conversion unit 2 is equal to the DC voltage of the support capacitor C of the first-stage conversion unit 2. For example, the DC voltage of the support capacitor C of the first-stage conversion unit 2 is Vo.

As shown in FIG. 4D, when the first switch S1 of the second-stage conversion unit 2 and the fourth switch S4 and the sixth switch S6 of the first-stage conversion unit 2 are turned on, the support capacitor C of the second-stage conversion unit 2 discharges electric energy to the resonant capacitor Cr and the support capacitor C of the first-stage conversion unit 2. In the steady state, the DC voltage of the resonant capacitor Cr of the first-stage conversion unit 2 is equal to the DC voltage of the support capacitor C of the first-stage conversion unit 2 (i.e., Vo). According to Kirchhoff's Voltage Law, the DC voltage of the support capacitor C of the second-stage conversion unit 2 is equal to the sum of the DC voltages of the resonant capacitor Cr and the support capacitor C of the first-stage conversion unit 2. That is, the DC voltage of the support capacitor C of the second-stage conversion unit 2 is equal to 2Vo.

As shown in FIG. 4E, when the first switch S1, the third switch S3 and the fifth switch S5 of the second-stage conversion unit 2 are turned on, the resonant capacitor Cr of the second-stage conversion unit 2 discharges electric energy to the support capacitor C of the second-stage conversion unit 2. In the steady state, the DC voltage of the support capacitor C of the second-stage conversion unit 2 is equal to 2Vo, and the DC voltage of the resonant capacitor Cr of the second-stage conversion unit 2 is equal to the DC voltage of the support capacitor C of the second-stage conversion unit 2 (i.e., 2Vo).

As shown in FIG. 4D, when the first switch S1 of the third-stage conversion unit 2 and the fourth switch S4 and the sixth switch S6 of the second-stage conversion unit 2 are turned on, the support capacitor C of the third-stage conversion unit 2 discharges electric energy to the resonant capacitor Cr of the second-stage conversion unit 2 and the support capacitor C of the first-stage conversion unit 2. In the steady state, the DC voltage of the resonant capacitor Cr of the second-stage conversion unit 2 is equal to 2Vo, and the DC voltage of the support capacitor C of the first-stage conversion unit 2 is equal to Vo. According to Kirchhoff's Voltage Law, the DC voltage of the support capacitor C of the third-stage conversion unit 2 is equal to the sum of the DC voltage of the resonant capacitor Cr of the second-stage conversion unit 2 and the DC voltage of the support capacitor C of the first-stage conversion unit 2. That is, the DC voltage of the support capacitor C of the third-stage conversion unit 2 is equal to 3Vo.

As shown in FIG. 4E, when the second switch S2, the third switch S3 and the fifth switch S5 of the third-stage conversion unit 2 and the first switch S1 of the second-stage conversion unit 2 are turned on, the resonant capacitor Cr of the third-stage conversion unit 2 discharges electric energy to the support capacitor C of the third-stage conversion unit 2 and the support capacitor C of the second-stage conversion unit 2. In the steady state, the DC voltage of the support capacitor C of the second-stage conversion unit 2 is equal to 2Vo, and the DC voltage of the support capacitor C of the third-stage conversion unit 2 is equal to 3Vo. According to Kirchhoff's Voltage Law, the DC voltage of the resonant capacitor Cr of the third-stage conversion unit 2 is equal to the sum of the DC voltage of the support capacitor C of the third-stage conversion unit 2 and the DC voltage of the support capacitor C of the second-stage conversion unit 2. That is, the DC voltage of the resonant capacitor Cr of the third-stage conversion unit 2 is equal to 5Vo.

As shown in FIG. 4D, when the fourth switch S4 and the sixth switch S6 of the third-stage conversion unit 2 are turned on, the support capacitor C of the power end 9 discharges electric energy to the resonant capacitor Cr of the third-stage conversion unit 2 and the support capacitor C of the first-stage conversion unit 2. In the steady state, the DC voltage of the resonant capacitor Cr of the third-stage conversion unit 2 is equal to 5Vo, and the DC voltage of the support capacitor C of the first-stage conversion unit 2 is equal to Vo. According to Kirchhoff's Voltage Law, the DC voltage of the power end 9 is equal to the sum of the DC voltage of the resonant capacitor Cr of the third-stage conversion unit 2 and the DC voltage of the support capacitor C of the first-stage conversion unit 2. That is, the DC voltage of the power end 9 is equal to 6Vo.

As mentioned above, if the architecture of the switched tank converter is not changed, the switched tank converter in different operation modes can achieve different transformer ratios.

From the above descriptions, the present disclosure provides a switched tank DC converter. The switched tank converter includes N conversion units 2, which are arranged in N stages, wherein N is an integer larger than or equal to 3. Each conversion unit is a first-type conversion unit or a second-type conversion unit. The output end of each conversion unit is electrically connected with the input end of a next-stage conversion unit. The output end of the first-stage conversion unit is electrically connected with a load end. The first-stage conversion unit is the first-type conversion unit. The input end of the Nth-stage conversion unit is electrically connected with a power end. Moreover, at least one conversion unit of the third-stage conversion unit to the Nth-stage conversion unit is the second-type conversion unit. The second end of the half-bridge clamping circuit of each second-type conversion unit of the second-stage conversion unit to the Nth-stage conversion unit is electrically connected with the first end of the support capacitor of the lower-stage conversion unit. The second end of the half-bridge clamping circuit of at least one second-type conversion unit of the third-stage conversion unit to the Nth-stage conversion unit is not electrically connected with the first end of the support capacitor of the first-stage conversion unit.

The switched tank converter has an N-stage conversion structure to achieve the highest transformer ratio of $2^N$. In case that the high transformer ratio is required, the circuitry of the switched tank converter is simplified and cost-effective. As the numbers of the first-type conversion unit and the second-type conversion unit or the connecting relationships are changed, different transformer ratios can be achieved. Moreover, one or more different DC voltages are outputted according to the number of the first-type conversion units. As the method of controlling the switches is changed, the transformer ratio of the switched tank converter can be dynamically adjusted.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A switched tank converter comprising N conversion units, which are arranged in N stages, wherein N is larger than or equal to 3, each conversion unit is selected from one of a first-type conversion unit and a second-type conversion unit, and each conversion unit comprises: an input end; an output end; a support capacitor having a first end and a second end, wherein the first end of the support capacitor is electrically connected with the output end; a half-bridge inverter circuit, wherein a first end of the half-bridge inverter circuit is electrically connected with the input end, and a second end of the half-bridge inverter circuit is electrically connected with the output end; a half-bridge rectifier circuit, wherein a first end of the half-bridge rectifier circuit is electrically connected with a ground end, and a second end of the half-bridge rectifier circuit is electrically connected with the first end of the support capacitor of a first-stage conversion unit; and a resonant circuit, wherein a first end of the resonant circuit is electrically connected with a middle point of the half-bridge inverter circuit, and a second end of the resonant circuit is electrically connected with a middle point of the half-bridge rectifier circuit, wherein the second end of the support capacitor of each first-type conversion unit is electrically connected with the ground end, and each second-type conversion unit comprises a half-bridge clamping circuit, wherein a first end of the half-bridge clamping circuit is electrically connected with the ground end, and a middle point of the half-bridge clamping circuit is electrically connected with the second end of the support capacitor of the second-type conversion unit, wherein the output end of each conversion unit is electrically connected with the input end of a next-stage conversion unit, the output end of the first-stage conversion unit is electrically connected with a load end, the first-stage conversion unit is the first-type conversion unit, and the input end of an Nth-stage conversion unit is electrically connected with a power end, wherein at least one conversion unit of a third-stage conversion unit to the Nth-stage conversion unit is the second-type conversion unit, wherein the second end of the half-bridge clamping circuit of each second-type conversion unit of a second-stage conversion unit to the Nth-stage conversion unit is electrically connected with the first end of the support capacitor of a lower-stage conversion unit, and the second end of the half-bridge clamping circuit of at least one second-type conversion unit of the third-stage conversion unit to the Nth-stage conversion unit is not electrically connected with the first end of the support capacitor of the first-stage conversion unit.

2. The switched tank converter according to claim 1, wherein each of the second-stage conversion unit to the Nth-stage conversion unit is the second-type conversion unit.

3. The switched tank converter according to claim 2, wherein in each of the second-stage conversion unit to the Nth-stage conversion unit, the second end of the half-bridge clamping circuit is electrically connected with the first end of the support capacitor of the next-stage conversion unit.

4. The switched tank converter according to claim 1, wherein each half-bridge clamping circuit comprises a first switch and a second switch in a complementary switch configuration, the first switch is electrically connected between the first end of the half-bridge clamping circuit and the second switch, and the second switch is electrically connected between the second end of the half-bridge clamping circuit and the first switch, wherein each half-bridge inverter circuit comprises a third switch and a fourth switch in a complementary switch configuration, the third switch is electrically connected between the fourth switch and the second end of the half-bridge inverter circuit, and the fourth switch is electrically connected between the third switch and the first end of the half-bridge inverter circuit, wherein each half-bridge rectifier circuit comprises a fifth switch and a sixth switch in a complementary switch configuration, the fifth switch is electrically connected between the sixth switch and the first end of the half-bridge rectifier circuit, and the sixth switch is electrically connected between the fifth switch and the second end of the half-bridge rectifier circuit.

5. The switched tank converter according to claim 4, wherein the third switch of each conversion unit, the fifth switch of each conversion unit and the second switch of each second-type conversion unit are synchronously turned on and synchronously turned off, and the fourth switch of each conversion unit, the sixth switch of each conversion unit and the first switch of each second-type conversion unit are synchronously turned on and synchronously turned off.

6. The switched tank converter according to claim 5, wherein each of the first switch, the second switch, the third switch, the fourth switch, the fifth switch and the sixth switch has a duty cycle of 50%.

7. The switched tank converter according to claim 4, wherein in at least one second-type conversion unit of the second-stage conversion unit to the Nth-stage conversion unit, the first switch is continuously turned on and the second switch is continuously turned off, wherein in the conversion units of the first-stage conversion unit to the Nth-stage conversion unit, the third switches of all conversion units, the fifth switches of all conversion units and the other second switches are synchronously turned on and synchronously turned off, and the fourth switches of all conversion units, the sixth switches of all conversion units and the other first switches are synchronously turned on and synchronously turned off.

8. The switched tank converter according to claim 1, wherein each conversion unit is operated at a variable frequency or a fixed frequency.

9. The switched tank converter according to claim 1, wherein the resonant circuit comprises an inductor or a capacitor.

10. The switched tank converter according to claim 1, wherein the resonant circuit comprises an inductor and a capacitor, which are connected with each other in series.

* * * * *